United States Patent [19]

Baley

[11] Patent Number: 4,738,049
[45] Date of Patent: Apr. 19, 1988

[54] FLY TRAP

[76] Inventor: Raymond J. Baley, 5N030 Ridge La., Bartlett, Ill. 60106

[21] Appl. No.: 76,845

[22] Filed: Jul. 23, 1987

[51] Int. Cl.⁴ ............................................. A01M 1/10
[52] U.S. Cl. ...................................................... 43/122
[58] Field of Search .................................. 43/122, 107

[56] References Cited

U.S. PATENT DOCUMENTS

| | | | |
|---|---|---|---|
| 855,308 | 5/1907 | Hansen | 43/122 |
| 882,306 | 3/1908 | Fredrickson | 43/122 |
| 2,014,500 | 9/1935 | Lass | 43/122 |
| 2,029,989 | 2/1936 | Driggers | 43/122 |
| 2,478,104 | 8/1949 | Johnson | 43/122 |
| 3,820,273 | 6/1974 | Novak | 43/122 |
| 4,217,723 | 8/1980 | Hrebec | 43/122 |
| 4,244,135 | 1/1981 | Harwoods | 43/122 |
| 4,551,941 | 11/1985 | Schneidmiller | 43/122 |

*Primary Examiner*—Gene P. Crosby
*Attorney, Agent, or Firm*—Charles F. Meroni, Jr.

[57] ABSTRACT

A fly trap comprised of a pair of upper and lower superimposed synthetic plastic trap sections defining an interior fly capturing chamber therebetween. The lower trap section has a centrally located upwardly dished fly collecting pocket with a fly admitting orifice in the dished pocket but disposed in spatial relation to the upper trap section. Fly trap supporting legs are projected beneath the lower trap section permitting flies to move beneath the lower trap section and into the dished fly collecting pocket. A fly bait locating area is located immediately beneath the fly collecting pocket between the legs. Attachment structure is provided at adjacent confronting edges of the upper and lower trap sections which includes resiliently yieldable detents disposed in an annular ring-like configuration securing the sections in assembled relation with one another. The upper trap section has a series of thin flexible vibratable walls each having a thickness in the range of 15 to 35 millimeters and extending above the lower trap section which walls are of such construction and character as to be capable of transmitting fly buzzing noises and vibrations from an interior of the fly capturing chamber to free flying flies disposed in proximity to the trap to attract them to the fly bait locating area.

20 Claims, 6 Drawing Sheets

FLY TRAP

FIELD OF THE INVENTION

The present invention relates to a new and improved fly trap. The present invention also concerns a new and improved fly trap construction comprised of a pair of synthetic plastic trap sections which together define a interior fly capturing chamber and where the components can be manufactured in their entirety in two synthetic molds, one for forming the upper section and the other for forming the lower section at an economical high production rate.

In the past, many different types of fly traps have existed, but none of them are believed to have embodied the new and improved operating and cost saving features which are herein disclosed and which involve my inventions.

According to important features of my invention, the fly trap components comprise the upper and lower plastic trap sections that can be broken down and shipped in separate stacks of upper trap sections in one stack and lower trap sections in another stack to reduce shipping costs.

Yet other features of my invention relate to a fly trap comprised of a pair of separately molded upper and lower superimposed synthetic plastic trap sections defining an interior fly capturing chamber therebetween, the lower section having a centrally located upwardly dished fly collecting pocket with a fly admitting orifice at an apex of the pocket but disposed in spatial relation to the upper section, fly trap supporting legs projecting beneath the lower section permitting flies to move beneath the lower section and into the dished fly collecting pocket, a fly bait locating area positionable immediately beneath the fly collecting pocket, and attachment means at adjacent confronting edges of the upper and lower sections securing the sections in assembled relation with one another, the upper section having a series of thin flexible vibratable wall area extending above the lower section and which wall area is of such construction and character as to be capable of transmitting fly buzzing noises and vibrations from an interior of the fly capturing chamber to free flying flies disposed in proximity to the trap to attract them to the fly bait area. The prior art known to me includes the following patents:

| U.S. Pat. No. | Patent Title | Patentee |
|---|---|---|
| 855,308 | Fly-Trap | I. Hansen |
| 1,289,466 | Fly Trap | C. P. Hasselgren |
| 1,393,438 | Trap | A. P. Greim |
| 1,864,431 | Trap for Catching Wild Bees | W. A. Grover |
| 2,478,104 | Fly Trap | H. L. Johnson |
| 3,820,273 | Fly and Insect Trap | John Novak |
| 4,490,938 | Flytrap | Stanley Z. Baker |

While the prior art shows a series of fly traps where the components are oriented in somewhat of a similar way as the components of my fly trap, none of them show a thin wall type of fly trap that can be manufactured from molded upper and lower superimposed synthetic plastic sections, and where the upper section has a thin flexible vibratable wall area extending above the lower section and which wall area is of such construction and character as to be capable of transmitting fly buzzing noises and vibrations from an interior of the fly capturing chamber to free flying flies disposed in proximity to the trap to attract them to the fly bait locating area. Those patents that issued in the early part of the century preceded the development of synthetic plastic and certainly did not involve any fly trap having the advantages of my construction.

U.S. Pat. No. 3,820,273 and U.S. Pat. No. 3,490,938 both relate to synthetic plastic traps. Neither of the patentees in these patents discloses the concept of providing a thin walled superimposed synthetic trap section where the buzzing noises and vibrations from an interior of the fly capturing chamber to free flying flies disposed in proximity to the trap to attract them to the fly bait locating area. With my trap the flies when entrapped will fly and strike the flexible side walls of the upper trap section and combined with their buzzing noises create a major attraction to free flying flies and will cause them to note the bait and travel to the underside of the trap adjacent to the fly admitting orifice on the lower trap section. The thin walls are critically dimensioned to achieve this desired effect. in the U.S. Pat. No. 3,820,273, the bait is located on the inside of the trap as it is with most of the patents uncovered in the search if not all of them. The U.S. Pat. No. 3,820,273 does have a cover or upper section 12, having an annular ridge 24 that is adapted to be pressed inwardly relative to the body to engage the lip 33 until the lip rolls over the body ridge to engage the body ridge in the grooves 34. In column 4, lines 22 etc., the patentee also states that the light rays of the lamp shows through the translucent cover 12 prime and body 11 prime and also through the aperture 41 and the bottom 13 prime so as to attract winged insects thereto in a well-known manner etc. This modification is shown in FIG. 5 where a light is mounted interiorly of the trap in place of the bait shown in FIG. 2. The fly trap in these patents do not possess the improved features of my highly improved low cost fly catching apparatus.

SUMMARY OF THE INVENTION

According to fly trap comprised of a pair of upper and lower superimposed synthetic plastic trap sections defining an interior fly capturing chamber therebetween, the lower section having a centrally located upwardly dished fly collecting pocket with a fly admitting orifice at an apex of the pocket but disposed in spatial relation to the upper section, fly trap supporting legs projecting beneath the lower section permitting flies to move beneath the lower section and into the dished fly collecting pocket, a fly bait locating area positionable immediately beneath the fly collecting pocket, and attachment means at adjacent confronting edges of the upper and lower sections securing the sections in assembled relation with one another, the upper section having a series of thin flexible vibratable wall area extending above the lower section and which wall area is of such construction and character as to be capable of transmitting fly buzzing noises and vibrations from an interior of the fly capturing chamber to free flying flies disposed in proximity to the trap to attract them to the fly bait locating area.

According to still further features of my invention I provided a fly trap comprised of a pair of upper and lower superimposed synthetic plastic trap sections defining an interior fly capturing chamber therebetween, the lower trap section having a centrally located upwardly dished fly collecting pocket with a fly admitting orifice in the dished pocket but disposed in spatial relation to the upper trap section, fly trap supporting legs projecting beneath the lower trap section permitting flies to move beneath the lower trap section and into the dished fly collecting pocket, a fly bait locating area positionable immediately beneath the fly collecting pocket between the legs, and attachment means at adjacent confronting edges of the upper and lower trap sections including resiliently yieldable detents disposed in an annular ring-like configuration securing the sections in assembled relation with one another, the upper trap section having a series of thin flexible vibratable walls each having a thickness in the range of 15 to 35 millimeters, and extending above the lower trap section which walls are of such construction and character as to be capable of transmitting fly buzzing noises and vibrations from an interior of the fly capturing chamber to free flying flies disposed in proximity to the trap to attract them to the fly bait area.

Yet other features of my invention are concerned with utilizing the flying activity of the flies when trapped in the interior fly capturing chamber where the flies strike the thin, flexible, vibratable wall area causing the wall area to vibrate while generating buzzing noises whereby untrapped free flying flies disposed in proximity to the trap are attracted to the fly bait area beneath the trap and are exposed to being trapped within the fly trap.

According to yet other features of my invention, I have found that optimum results are obtainable where the upper plastic section has walls having a thickness of 30 millimeters.

According to yet other features of my invention, I prefer that the upper synthetic trap section be pyramidal in shape and where the synthetic plastic consists of one of the group comprised of polycarbonate, PETG, vinyl, and generic modified styrene. Yet other features of my invention relate to providing an upper fly trap section comprised of a solid unbroken mass of material to prohibit the entry of water from rainfall into the fly collection. Yet still other features of my invention relate to the upper and lower trap sections being different colored with the upper trap section being transparent and with the lower trap section being one of the following colors including blue, yellow and black, thus enabling a fly when beneath the fly trap to obtain a visual impression that the fly omitting orifice simulates a porthole to the sky since light will be readily transmitted through the transparent upper section to the fly admitting orifice.

Still further features of my invention involve a fly trap where the upper and lower trap sections being four sided, the attachment means comprising circumferentially spaced detents positioned between the edges of the four sided upper and lower trap sections so that the edge of one trap section can snap behind the detents to secure the upper and lower trap sections in snap-on, snap-off relation together.

BRIEF DESCRIPTION OF THE DRAWINGS

According to other objects and features of my invention will more fully become apparent in view of the following detailed description of the drawings illustrating the single embodiment.

DESCRIPTION OF A PREFERRED EMBODIMENTS

The reference number 10 indicates generally a fly trap which embodies the features of my invention. The trap is comprised of upper and lower superimposed synthetic plastic trap sections 11 and 12. The trap sections 11 and 12 cooperate to provide an interior fly capturing chamber 13. The lower trap section 11 has a centrally located upwardly dished fly collecting pocket 14 which is preferably of a pyramidal shape although other shapes may be used such as a dome-shape or a square-shape. The pocket 14 has a fly admitting orifice 15 positioned at the apex of the pocket or pyramidally-shaped pocket.

Figure 1:
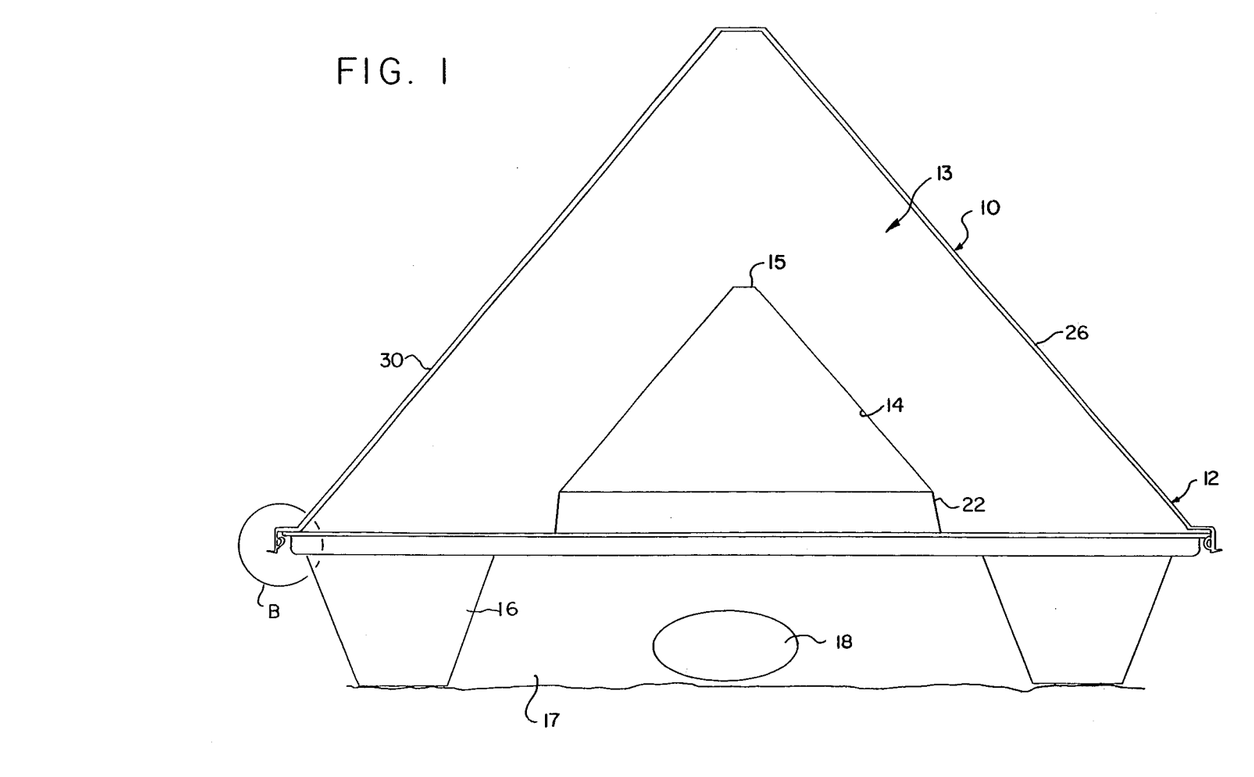
FIG. 1 is a side elevation of my fly trap.
Figure 1A:
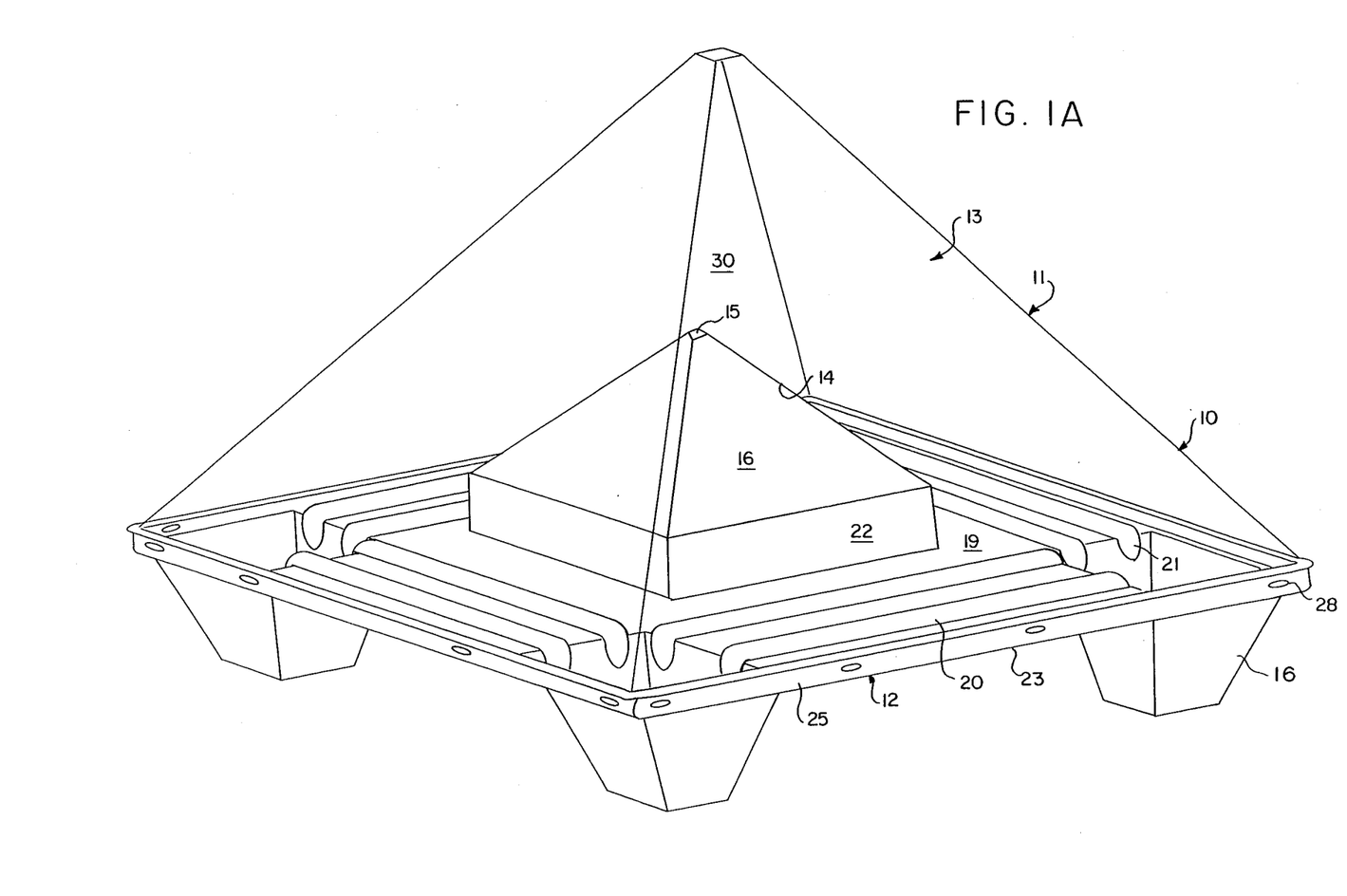
FIG. 1A is a prospective view of the fly trap shown in FIG. 1.

As will be seen from FIG. 1, the trap section 11 is supported upon four hollow molded fly trap supporting legs 16. These legs 16 are internally hollow and open into the interior of the fly capturing chamber 13 so that dead flies can accumulate in the pockets or repositories defined by the legs. Thus, the legs serve a multiple function in that they not only function to support the fly trap and the sections 11 and 12 but they also serve to provide receptacles or repositories for the dead flies. Still further, if desired, sand or dirt can be deposited in the hollow leg receptacles to weight the fly trap so that if it is located in a windy location, the trap can be more fixedly positioned in a predetermined location and be thereby less subject to being moved by wind or other forces. Now, the legs also serve to provide another function in that the legs elevate the superimposed trap sections 11 and 12 above a ground supporting area indicated at 17. A suitable bait is adapted to be located beneath the trap 10 between the legs 16 and directly underneath the centrally located upwardly dished fly collecting pocket 14. The bait is identified at 18 in FIG. 1. This bait can be of any suitable type such as rotting meat, fish or any other suitable material which is apt to draw flies to the trap 10.

Figure 2:
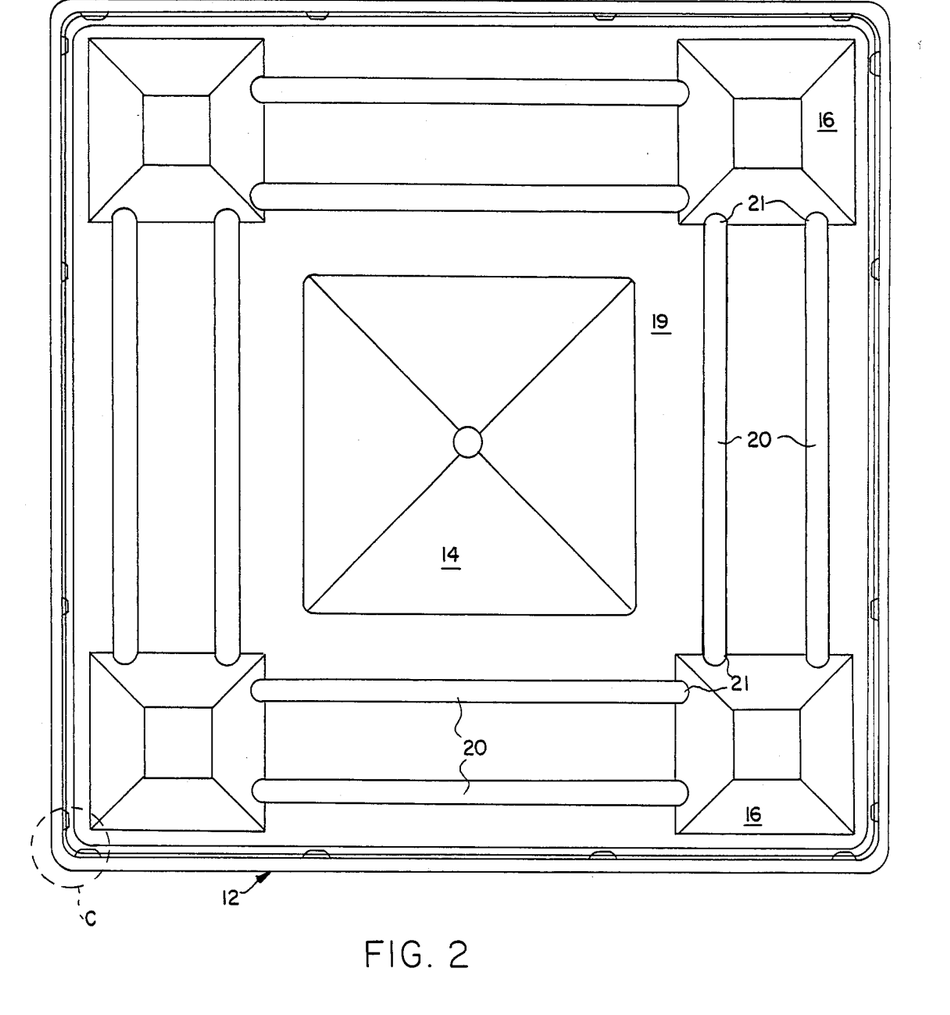
FIG. 2 is a top plan view of the lower section of my fly trap.
Figure 3:
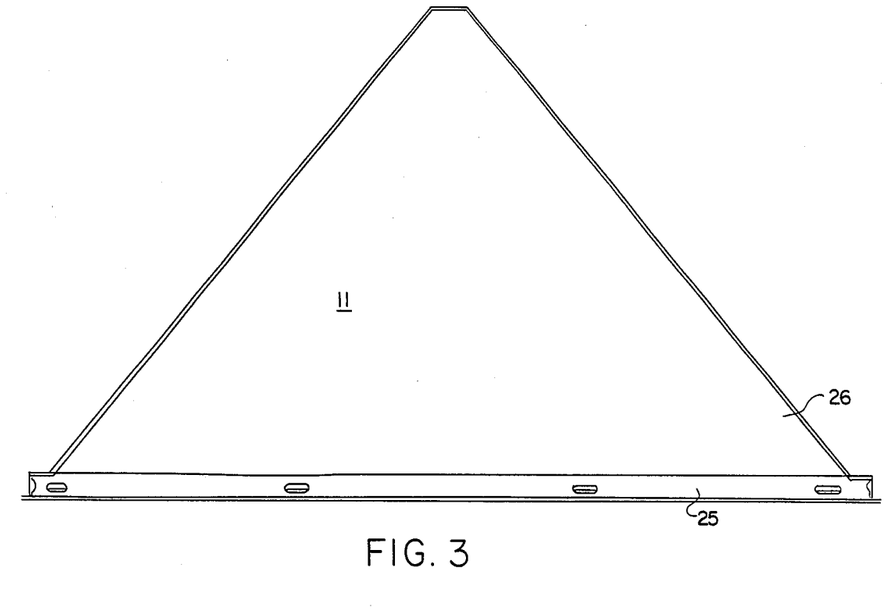
FIG. 3 is a side view of the upper section of my fly trap which appears in FIGS. 1 and 1A.
Figure 4:
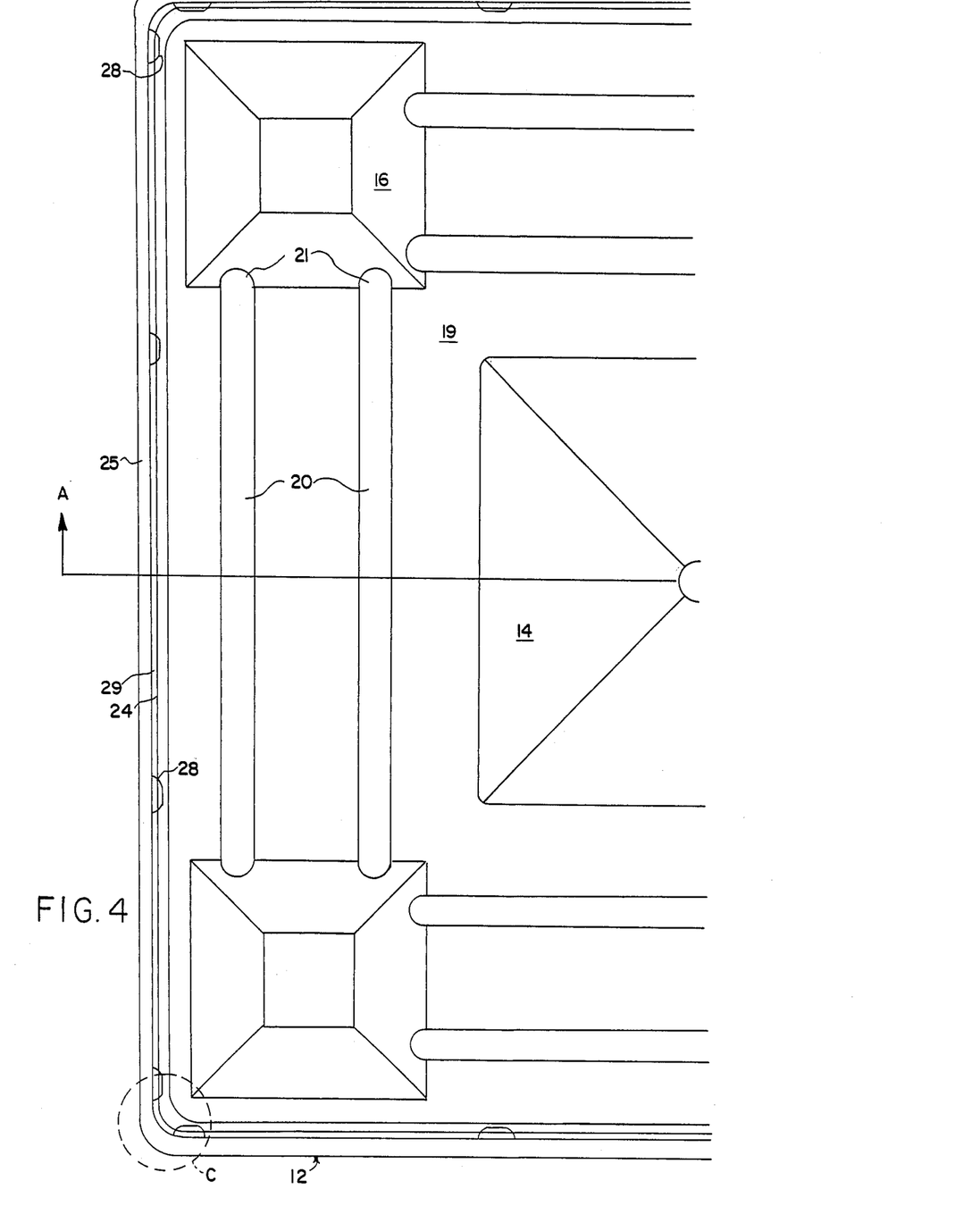
FIG. 4 is an enlarged fragmentary plan view of the lower section also shown in FIG. 2.
Figure 5:
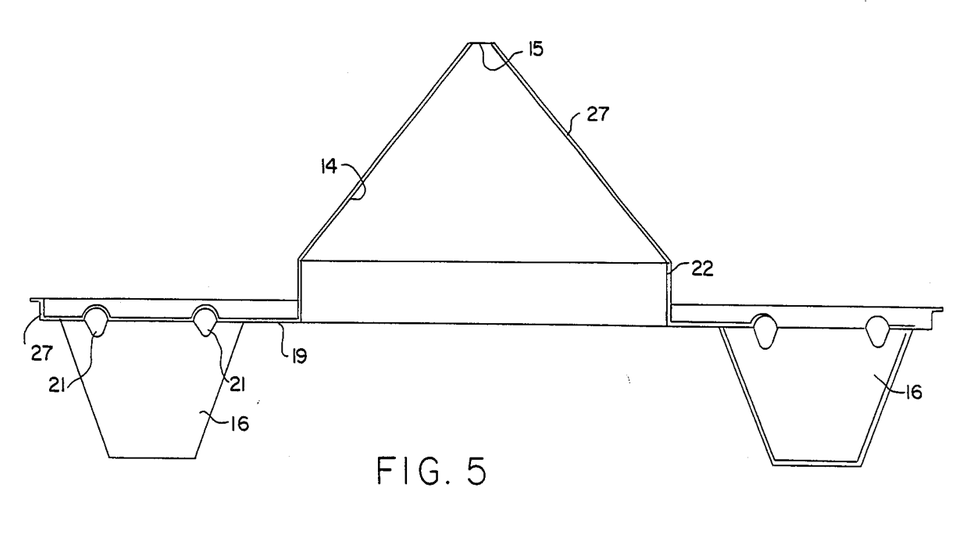
FIG. 5 is an enlarged side elevation of the lower section of my fly trap.
Figure 6:
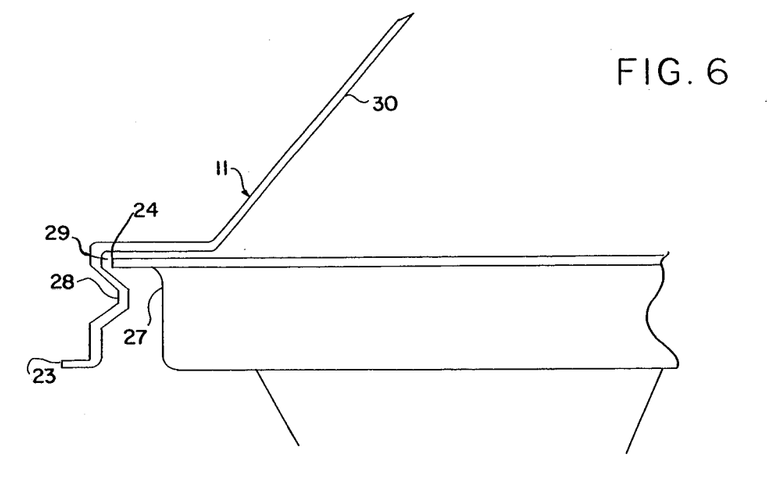
FIG. 6 is an enlarged fragmentary partially section view as appearing in section B of FIG. 1.
Figure 7:
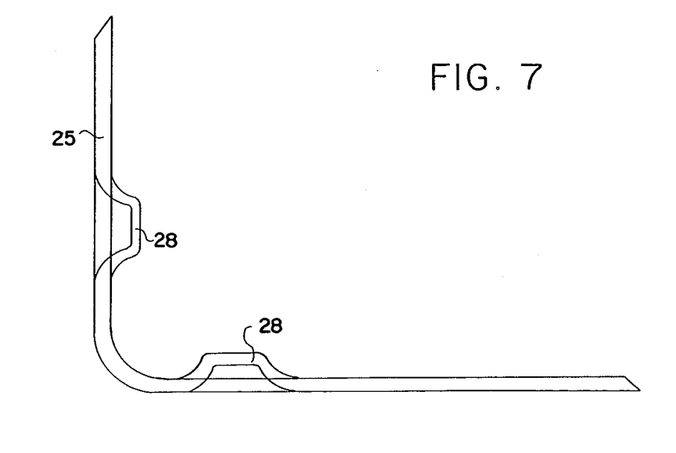
FIG. 7 is an enlarged framentary bottom view of a corner of the upper section showing the detents for securing the sections in assembly together.

The lower trap section 11 is also illustrated in FIGS. 2, 4, 5, 6, and 7. The lower trap section 11 includes a parallel sided or square shaped platform area 19. The platform area 19 is of a molded construction and as seen in FIGS. 2 and 4, is interupted by the hollow trap supporting legs 16, as seen in FIGS. 2 and 4. It will further be seen that the platform area 19 of the lower trap section 11 has a series of annularly arranged sets of parallel reinforcing ribs 20—20. Each end of each rib 20 extends into the hollow area defined by the fly trap supporting legs 16 as is seen in FIG. 5 and as is noted at 21. These rib extensions 21 serve to reinforce the juncture of the hollow legs with the flat platform area 19.

The pyramidally-shaped upwardly dished fly collecting pocket 14 has a square-shaped upright base section 22 which functions to structurally join the platform area 19 to the pyramidally-shaped fly collecting pocket 14 and actually comprises the lower outer rim of the pocket. By providing a square-shaped trap section 22 in the position where it is located, the juncture of the pyramidallyshaped fly collecting pocket 14 with the platform area 19 is materially reinforced. In the preferred form illustrated in the drawings, the base section 22 has a vertical dimension of 11/16" and has a length of approximately 4⅛" on each side of the pyramidally-shaped dished fly collecting pocket 14.

The upper trap section or cover 11 constitutes the solid enclosed trap area and by making the top section cover 11 as a solid mass of material, no rain can enter the trap except possibly in a flooding condition where water could enter the fly collecting pocket from beneath the pocket. As indicated before, the upper trap section 11 is of a pyramid-shape and has four sides which are equi-distant in length. If desired, the cover 11 could be of a dome shape or possibly square or boxed shaped. If either of the other shapes were used, it would be contemplated that the bottom of the dome shape or of the square or box shape would be open and would be positioned over the upwardly dished fly collecting pocket 14 and positioned in the same manner as the tray sections 11 and 12 as shown in FIG. 1. The pyramidal-shaped upper trap section the preferred configuration.

The upper trap section 11 has an L-shaped upper trap section rim 26 which connects the outer edge to the pyramidal wall or sides 27 of the pyramidally-shaped upper trap section 11. The outer edge 24 of the lower section is connected to the platform area 19 (FIG. 6) by an outer L-shaped lower trap section rim 27. The upper and lower superimposed trap sections 11 and 12 have outer edges 23 and 24 respectively.

The outer rim 25 of the upper trap section 11 has a series of annurarly arranged detents 28 (FIGS. 6 and 7) which project inwardly of the upper trap section rim 25 above the exterior edge extending about the four sides 26 of the upper trap section 11.

Now according to features of my invention, the outer edge 23 of trap section 12 is constructed so as to be of a slightly larger exterior dimension than the dimension of the detents 28 so that the edge of the lower trap section can snap over the detents and be secured in positive fixed relation with respect to the upper trap section 11. These detents 28 in fact operate to provide a detent pocket area 29 (FIG. 6) where the outer edge of the lower trap section may be lodged when assembled with the upper trap section 11. It will be further observed from FIG. 7 that the detents are pressed interiorly of the rim of the upper trap section rim 25. Preferably, each side of the four sided pyramidally-shaped upper trap section 11 is provided with four detents thus totalling 16 detents or fasteners 28. The detents are of a ribbed configuration to enable the edge of the lower trap section 12 to be readily moved thereover and into the detent pocket area 29. The outer rim 25 of the upper trap section 11 has an inside dimension that is approximately 1/32" larger than the outside edge 24 of the lower trap section enabling the edges to be positioned in telescoped relation to one another.

According to important features of my invention, the side walls of the upper section co-act together to define a thin flexible vibratable wall area 30 preferably having a thickness in the range of 15-35 millimeters and a preferred thickness of 30 mm. wall. The area 30 is composed of the thin flexible vibratable walls 32 of the pyramidal-shaped upper trap section 11. The synthetic plastic used in the molding of the fly trap and of the pair of upper and lower superimposed synthetic plastic trap sections 11 and 12 preferably is comprised of one of a group including polycarbonate, PETG, vinyl, and generic modified styrene. In my preferred trap construction, the upper and lower trap sections 11 and 12 can be made from a clear polyvinyl chloride type of synthetic plastic. As explained, it is preferred that the top or upper trap section 11 be of a clear or transparent construction. If it is desired to reduce the costs to a bear minimum the lower trap section 12 can be made from a high impact polystyrene synthetic plastic which is otherwise known as HIPS.

In my test with my fly trap, I have found that where the upper and lower trap sections are of different colors that certain advantages can be gained. Preferably, the upper trap section 11 is of a transparent coloration while the lower section may be of a blue, yellow or black color. By using colored transparent trap sections, a fly, when entering beneath the fly trap, can obtain a visual impression that the fly admitting orifice 15 simulates a porthole to the sky since light will be readily transmitted through the transparent upper trap section 11 to the fly admitting orifice 15 on the lower trap section whereby the fly is more apt to seek an escape route from the fly collecting pocket 14 in a direction towards the open area above and into the interior fly catching chamber 13.

Once the fly enters the trap fly collecting through the fly admitting orifice 15 it becomes trapped and will soon expire there particularly where the conditions are relatively hot and where there is little air circulation within the fly collecting chamber 13. It has been found that the flies will very often perish in hot weather in a matter of two or three minutes under ideal conditions. It has been further found that where the fly admitting orifice has a diameter or an opening of about ½" that there is little chance for the fly to escape from the interior fly collecting chamber 13.

It has been further found that by constructing the pyramidally-shaped wall area of the upper trap section so as to have a thickness preferably of 30 millimeters and/or in the range of 15 to 35 millimeters that when the fly enters the fly catching chamber 13, the fly tends to fly against the thin vibratable wall area and thereby generate fly buzzing noises and vibrations from the interior of the fly capturing chamber. In this way, free flying flies located or in proximity to the trap at the outside thereof are attracted to the fly trap and more particularly to the fly bait locating area once the aroma of the bait 18 is detected by the fly. By constructing a fly trap in the new way here disclosed the overall attractiveness of the fly trap is accentuated to enable a large number of flies to be attracted to and caught within the fly collecting chamber 13 where they can then be entrapped and removed from the area that the trap owner is attempting to clear of flies.

In the preferred construction, I found that excellent results can be obtained where the upper trap section 11 and the lower trap section 12 have the following dimensions:

lower trap section dimensions: 10 ¾"×10/34"×6" high upper trap section dimensions: 10-9/16"×10-9/16"×4 ⅛" high.

I claim:

1. A fly trap comprised of a pair of upper and lower superimposed synthetic plastic trap sections defining an interior fly capturing chamber therebetween, the lower section having a centrally located upwardly dished fly collecting pocket with a fly admitting orifice at an apex of the pocket but disposed in spatial relation to the upper section, fly trap supporting legs projecting beneath the lower section permitting flies to move beneath the lower section and into the dished fly collecting pocket, a fly bait locating area positionable immediately beneath the fly collecting pocket, and attachment means at adjacent confronting edges of the upper and lower sections securing the sections in assembled relation with one another, the upper section having a thin flexible vibratable wall area extending above the lower section and which wall area is of such construction and character as to be capable of transmitting fly buzzing noises and vibrations from an interior of the fly capturing chamber to free flying flies disposed in proximity to the trap to attract them to the fly bait locating area.

2. The fly trap of claim 1 further characterized by the upper plastic section having walls having a thickness of 15 to 30 millimeters.

3. The fly trap of claim 1 further characterized by the upper synthetic plastic trap section being pyramidally shaped and the thin vibratable wall area having walls with a thickness in the range of 15 to 35 millimeters, the synthetic plastic consisting of one of the group comprised of polycarbonate, PETG, vinyl, and generic modified styrene.

4. The fly trap of claim 1 further characterized by the bottom external edge of the upper trap section having an inside dimension that is approximately 1/32" larger than the outside edge of the lower section enabling the edges to be positioned in telescoped relation to one another, and said attachment means being positioned between said edges for enabling the upper and lower sections to be engaged in snap-on, snap-off relation in assembly together when the edges are positioned in telescoped relation.

5. The fly trap of claim 1 further characterized by ribs being positioned in annularly spaced relation about the fly collecting pocket on the lower sectio and constructed and arranged to rigidify and stabilize the lower section enabling the upper and lower sections to be readily snapped together.

6. The fly trap of claim 1 further characterized by the upper and lower trap sections being four sided, the attachment means comprising circumferentially spaced detents positioned between the edges of the four sided upper and lower trap sections so that the edge of one trap section can snap behind the detents to secure the upper and lower trap sections in snap-on, snap-off relation together.

7. The fly trap of claim 1 further characterized by the upper trap section having four triangularly spaced converging walls which are joined at upper ends at an apex of the upper fly capturing chamber and with the walls having a thickness in the range of 15 mm to 35 mm.

8. The fly trap of claim 1 further characterized by the fly admitting orifice having a diameter of approximately one half inch and by the legs of the fly trap being adapted to sustain the trap over a ground carried bait.

9. A fly trap comprised of a pair of upper and lower superimposed synthetic plastic trap sections defining an interior fly capturing chamber therebetween, the lower trap section having a centrally located upwardly dished fly collecting pocket with a fly admitting orifice in the dished pocket but disposed in spatial relation to the upper trap section, fly trap supporting legs projecting beneath the lower trap section permitting flies to move beneath the lower trap section and into the dished fly collecting pocket, a fly bait area located immediately beneath the fly collecting pocket between the legs, and attachment means at adjacent confronting edges of the upper and lower trap sections including resiliently yieldable detents disposed in an annular ring-like configuration securing the sections in assembled relation with one another, the upper trap section having a series of thin flexible vibratable walls each having a thickness in the range of 15 to 35 millimeters, and extending above the lower trap section which walls are of such construction and character as to be capable of transmitting fly buzzing noises and vibrations from an interior of the fly capturing chamber to free flying flies disposed in proximity to the trap to attract them to the fly bait locating area.

10. The fly trap of claim 9 further characterized by the synthetic plastic consisting of one of the group comprised of polycarbonate, PTEG, vinyl, and generic modified styrene.

11. The fly trap of claim 10 further characterized by the bottom external edge of the upper trap section having an inside dimension that is approximately 1/32" larger than the outside edge of the lower trap section enabling the edges to be positioned in telescoped relation to one another, and said detents being positioned between said edges and integral with one of said trap sections for enabling the upper and lower trap sections to be engaged in snap-on, snap-off relation in assembly together when the edges are positioned in telescoped relation.

12. The fly trap of claim 9 further characterized by the upper trap section constituting a solid unbroken mass of molded synthetic plastic material to prohibit the entry of water from rainfall into the fly collection area.

13. The fly trap of claim 9 further characterized by ribs being positioned in annularly spaced relation about the fly collecting pocket on the lower trap section and constructed and arranged to rigidify the lower trap section so that the upper and lower trap sections can be more readily snapped together.

14. The fly trap of claim 9 further characterized by the upper trap section having four triangularly spaced converging walls which are joined at upper ends at an apex of the upper fly capturing chamber and with the fly admitting orifice having a diameter of approximately one half inch.

15. The fly trap of claim 9 further characterized by the dished fly collecting pocket having a square-shaped base section and a pyramidally-shaped section mounted top side of the base section.

16. The fly trap of claim 15 further characterized by the lower trap section having been molded with all component parts integral in molded assembly together.

17. The fly trap of claim 9 further characterized by the upper lower trap section having been molded with all component parts integral in molded assembly together.

18. The fly trap of claim 9 further characterized by the fly trap supporting legs being of an upwardly opening cup-like configuration providing repositories for dead flies.

19. A fly trap of claim 9 further characterized by the dished fly collecting pocket being pyramidal in shape and mounted on a platform area of the lower trap section, the platform are having sets of parallel reinforcing ribs extending in parallel relation to each side of the pyramidal-shape fly collecting pocket, the fly trap supporting leggs being disposed at the four corners of the lower section and comprising dished cups for receiving either sand for weighing the fly trap upon a ground supporting surface or for receiving dead flies therein.

20. A ground supported type of fly trap comprised of a pair of upper and lower superimposed trap sections defining an interior fly capturing chamber therebetween, the lower trap section having a centrally located upwardly dished fly collecting pocket with a fly admitting orifice at an apex of the pocket but disposed in spatial relation to the upper section, fly trap supporting legs projecting beneath the lower trap section permitting flies to move beneath the lower trap section and into the dished fly collecting pocket, a fly bait area located immediately beneath the fly collecting pocket, and attachment means at adjacent confronting edges of the upper and lower trap sections securing the sections in assembled relation with one another, the upper trap section having a pyramidal-shape and being provided with a series of thin flexible vibratable walls each having a thickness in the range of 15 to 35 millimeters and extending above the lower trap section which are of such construction and character as to be capable of transmitting fly buzzing noises and vibrations from an interior of the fly capturing chamber to free flying flies disposed in proximity to the trap to attract them to the fly bait locating area, the upper and lower trap sections being comprised of a synthetic plastic consisting of one of the group comprised of polycarbonate, PETG, vinyl, and generic modified styrene, the bottom external edge of the upper trap section having an inside dimension that is slightly larger than the outside edge of the lower trap section enabling the edges to be positioned in telescoped relation to one another, the attachment means further comprising circumferentially spaced detents positioned between the edges of the upper and lower trap sections and integral with one of said trap sections so that the edge of one trap section can snap behind the detents to secure the upper and lower trap sectios and snap-on, snap-off relation together, the upper and lower trap sections being different colored with the upper trap section being transparent and with the lower trap section being one of the following colors including blue, yellow and black, thus enabling a fly when beneath the fly trap to obtain a visual impression that the fly admitting orifice simulates a porthole to the sky since light will be readily transmitted through the transparent upper flap section to the fly admitting orifice on the lower flap section.

* * * * *